Dec. 31, 1957          C. L. CALLUM          2,817,944
ROTARY BALER WITH BALE EJECTING MEANS
Filed Oct. 21, 1955
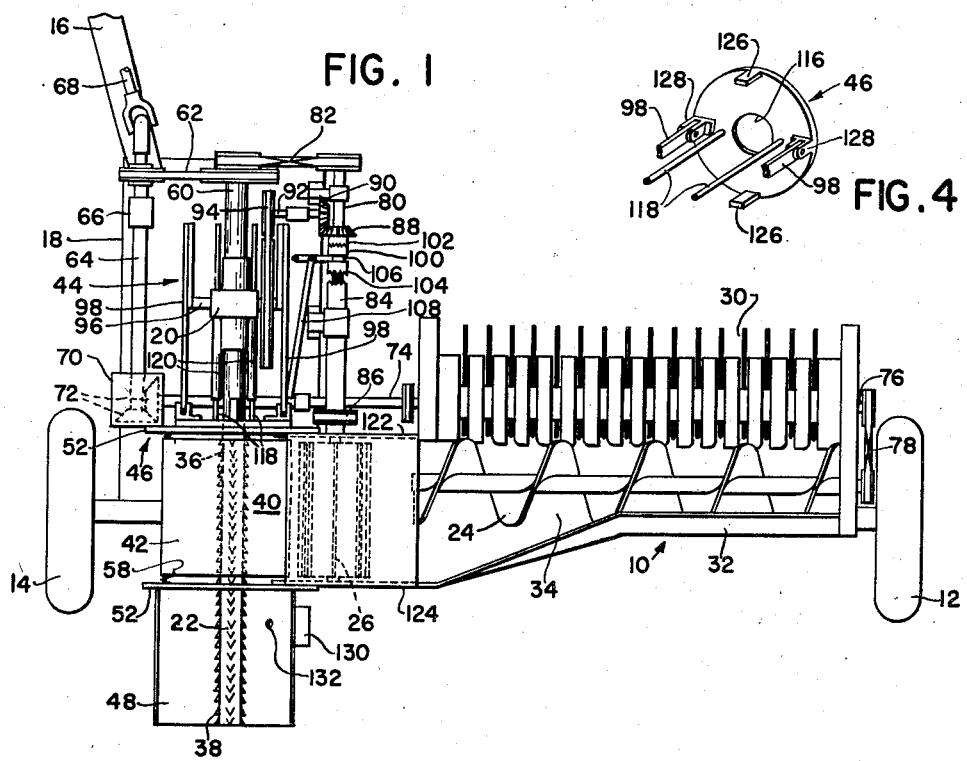
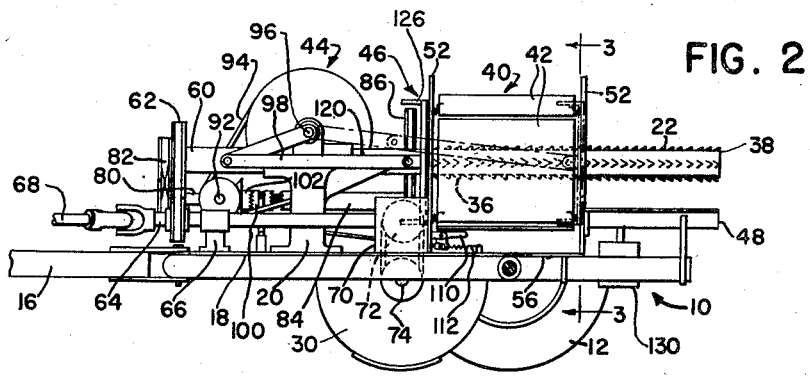
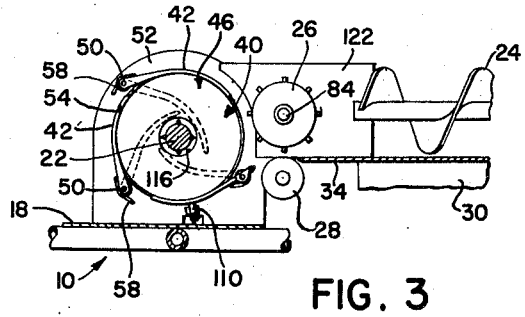
INVENTOR.
C. L. CALLUM United States Patent Office 2,817,944
Patented Dec. 31, 1957

2,817,944

ROTARY BALER WITH BALE EJECTING MEANS

Charles L. Callum, Ottumwa, Iowa, assignor to Deere Manufacturing Co., Dubuque, Iowa, a corporation of Iowa Application October 21, 1955, Serial No. 542,048

10 Claims. (Cl. 56—341)

This invention relates to an agricultural crop baler and more particularly to a baler of the type in which crops are wound on a rotary spindle to accumulate as bales of cylindrical form.

One of the principal objects of the invention is to provide an improved baler that utilizes the principle of the winding of bales as distinguished from the accumulation of bales by a reciprocating member such as a conventional plunger. The invention features means for feeding crops to the rotating spindle, together with means for ejecting the accumulated bale when it has attained a predetermined cylindrical size. Other features of the invention reside in actuating means for the bale ejector, control means for coordinating the various bale forming operations and the provision of an extremely lightweight and economically designed machine.

The foregoing and other important objects and desirable features inherent in and encompassed by the invention will become apparent as a preferred embodiment thereof is disclosed in detail in the ensuing specification and accompanying drawing, the several figures of which will be described immediately below.

Fig. 1 is a plan view of the baling machine.

Fig. 2 is a side elevational view, partly in section, of the baling machine.

Fig. 3 is a fragmentary sectional view as seen along the line 3—3 of Fig. 2.

Fig. 4 is a perspective view of the bale ejector, with parts in section.

The machine chosen for the purposes of illustration comprises a mobile main frame 10 carried by right and left hand wheels 12 and 14, respectively, for advance over a field of crops. The forward end of the machine can be ascertained by the location of a forwardly extending draft tongue 16 by means of which the machine may be connected to a propelling vehicle such as a tractor, the main frame 10 including a forwardly projecting platform portion 18 to which the draft tongue 16 is connected and on which various components of the driving mechanism, to be described later, are supported.

The platform 18 includes, ahead of the axis of the wheels 12 and 14, an upstanding integral support 20 in which is journaled a fore-and-aft extending crop-winding spindle 22, which spindle is barbed, as shown, to wind crops received from feed means including a transverse feeding auger 24 and a pair of feed rolls 26 and 28, the latter being respectively journaled on the frame on axes parallel to that of the spindle 22. The main frame carries pick-up means 30, which may be of any conventional construction, and which operates in any well-known manner to pick up field-borne crops and to deliver these crops rearwardly to the auger 24, which auger is backed up by a rear wall 32 that forms an upright extension of a floor 34 below the auger 24. This floor terminates at the feed rolls 26 and 28 (Fig. 3). The arrangement is such that as the main frame advances, the pick-up means 30 picks up or collects crops from the field, transfers these crops rearwardly to the auger 24, and the auger moves these crops laterally to the feed rolls 26 and 28 which in turn transfer or feed the crops to the spindle in a direction transverse to the length of the spindle. As the spindle rotates, the crops fed thereto are accumulated until the crops attain a cylindrical bale form. When the bale has attained a predetermined cylindrical size, it is moved axially of the spindle 22 from a first end portion 36 to a second or rear end portion 38, the amount of movement of the bale being sufficient to move the bale clear of the feeding and bale forming zone represented generally by the numeral 40. Control means, in the form of a plurality of radially displaceable plate-like devices 42 are associated with the spindle (Fig. 3) and move respectively from radially inward positions (dotted lines, Fig. 3) to radially outward positions as the bale accumulates. When the devices 42 attain the full line positions of Fig. 3, they effectuate actuating means 44 for causing reciprocation of bale-moving or ejector means 46. The theory of operation is that the plates 42 will gradually move outwardly from the dotted line positions of Fig. 3 to the full line positions of Fig. 3 when the bale attains a predetermined cylindrical size, after which the ejector 46 moves the bale to the end 38 of the spindle and then retracts to its starting position so that a second bale can be formed on the spindle portion 36. When the second bale is completed, the plates 42 will again move outwardly and will again cause actuation of the ejector. When the second bale is moved to the rear on the spindle 22, the first bale will be ejected from a bale support or chute 48. The ejected bales may be collected in any suitable manner not material here.

Each plate 42 is pivoted on a fore-and-aft extending shaft 50 which is supported at opposite ends respectively by a pair of fore-and-aft spaced apart upright ring-like members 52, each of which members has a large central opening 54 to accommodate the bale and the ejector 46. The members 52 are suitably attached in any rigid fashion to the platform portion 18 of the frame, which portion has a rearward extension 56 (Fig. 2) for this purpose. Each plate 42 is biased, as by a torsion spring 58 to its radially inward position (dotted lines, Fig. 3).

Journaling of the extreme forward and unbarbed portion of the spindle 22 in the support 20 is accomplished in any convenient manner so that the spindle has a forward shaft extension 60 which is driven by means 62 from a driven shaft 64 appropriately journaled at 66 on the frame platform 18. Power for the shaft 64 is supplied by a propeller shaft 68, which may be connected to the power take-off shaft (not shown) of the propelling vehicle (also not shown). The rearward end of the shaft 64 enters a gear case 70 which contains bevel gearing 72 for driving a transverse pick-up drive shaft 74. A pick-up shaft 76, connected to and coaxial with the shaft 74 operates through a crossed belt 78 and appropriate sheaves to drive the feed auger 24.

The front end of the spindle shaft 60 serves as means for driving the feed rolls and the actuating means 44. For this purpose, the platform 18 carries along the right hand edge portion thereof a fore-and-aft extending intermediate shaft 80 which is belted by a crossed belt 82 to the spindle shaft 60. The shaft 80 journals thereon a concentric sleeve 84 which has its rear end connected by a crossed belt 86 to the lower feed roll 28, the sleeve extending coaxially into and for driving the upper feed roll 26.

The shaft 80 also journals thereon, in axially spaced relationship to the sleeve 84, a bevel gear 88 which is in constant mesh with a companion bevel gear 90 on a transverse short shaft 92, the inner end of which is belted at 94 to a crank shaft 96. This crank shaft is journaled in the support 20 so that its main axis is transverse to the axis of the spindle shaft 60. The arms of the crank are connected by a pair of connecting rods, each in the form of a pitman 98, to the front face of the ejector 46.

From the description thus far, it will be seen that, since the bevel gear 88 and sleeve 84 are journaled on the shaft 80, they will not be driven by rotation of the shaft 80 unless some form of interconnecting driving means is provided. In the present case, this drive means co-ordinates the driving of the feed rolls 26 and 28 with mobilizing and demobilizing of the crank 96. The specific type of mechanism shown comprises an axially shiftable clutch member 100 rotatable with and axially slidable relative to the shaft 80. The clutch has opposite jaws 102 and 104 for engagement respectively with the bevel gear 88 and the sleeve 84. When the clutch member 100 is in its forward position as shown in Fig. 1, the jaw 102 engages the bevel gear 88 and connects that gear to the shaft 80 for rotation in unison with the shaft, thereby driving or mobilizing the crank shaft 96 and ejector 46, at the same time disengaging the jaw 104 from the sleeve 84 so that the feed rolls 26 and 28 are stopped or demobilized. Shifting of the clutch 100 in the opposite direction has the opposite effect; that is, the sleeve 84 and consequently the feed rolls 26 and 28 are driven and the crank is demobilized. The purpose of this arrangement will be brought out below.

The drive means thus established between the sleeve 84, gear 88 and shaft 80 is under control of the plates 42, such plates thus constituting control means to which the actuating means and feed rolls are responsive. The clutch member 100 is shifted by a clutch fork 106 which in turn is controlled by a link 108 having its rear end connected to a bell crank 110 just below the lowermost of the plates or devices 42, the arrangement being such that when the lowermost plate 42 moves to its radially outward position (full lines in Fig. 3) it engages the bell crank and, rocking that bell crank, shifts the link 108 to shift the clutch member 100 forwardly for engagement of the clutch jaw 102 with the bevel gear 88. A spring 112 returns the bell crank and consequently returns the clutch member 100 to its rear position in which the jaw 104 engages the sleeve 84.

The ejector 46 preferably comprises a circular plate having a central opening 116 for accommodating the spindle 22. Mounting of the plate for movement axially of the spindle is accomplished by a pair of guide bars 118 which are slidably supported in guides 120 preferably formed as an integral part of the support 20. Consequently, although the ejector 46 is capable of reciprocation axially as respects the spindle 22, it is supported in such manner that it does not interfere with rotation of the spindle, nor do the barbs on the spindle interfere with reciprocation of the ejector. The throw of the crank 96 is such that the ejector moves from the full line position of Fig. 2 to the dotted line position of Fig. 2, from which it will be seen that the length of each bale formed is equal to the distance between the supports 52. The width of the feed zone 40, as measured axially of the spindle 22, is further augmented by front and rear walls 122 and 124 which afford a housing for the feed rolls 26 and 28. As the crops accumulate on the spindle portion 36 and ultimately attain their predetermined cylindrical size as a bale, the plates 42 are forced radially outwardly against the bias of their respective torsion springs 58 and at that point the plates lie on a circle large enough to permit reciprocation of the ejector 46. At the same time, the control means operates to cause actuation of the actuating means 44 for reciprocating the ejector, the ejector having its rear face abutting the bale just formed so that that bale is moved onto the portion 38 of the spindle. As the ejector moves from front to rear, it clears the plates 42, which are held in radially expanded positions by the bale, until the bale clears the plates. However, the plates are prevented from returning immediately to their radially inward positions by holding means in the form of lugs 126 on the ejector. These lugs are augmented by ears 128 which serve as connection points for the pitmans 98. The lugs 126 and ears 128 thus serve as stops to prevent returns of the plates 42 to their radially inward positions until the ejector is retracted to its starting position, after which another bale-forming cycle is begun.

The bale moved onto the spindle portion 38 will, of course, continue to be rotated by the rotating spindle. During this phase of the operation, twine or any other tying medium may be wrapped around the bale. A representative tying-medium-feeding means is shown by the numeral 130, which has a twine feeding opening 132 into the bale support or chute 48. The details of the tying mechanism are not important here. Suffice it to say that it may be of the type shown in the U. S. patent to Luebben 2,096,990. In certain types of crops and, depending upon the pressure exerted by the plates 42, the tying operation may be dispensed with.

*Operation*

As the machine advances over the field, the pick-up means 30 collects field-borne crops and transfers them rearwardly to the auger 24, which operates to move the crops laterally or to the left and through the feed rolls 26 and 28, it being understood that as long as the plates or devices 42 are in their radially inward positions, the clutch jaw 104 engages the clutch member 100 with the feed roll sleeve 84, consequently causing driving of the feed rolls while the actuating means or crank 96 is demobilized and in the position of Fig. 1 (full lines in Fig. 2). The crops are thus fed between the feed rolls 26 and 28 and between the spindle and the plates 42. As the crops accumulate in cylindrical form, the plates 42 move gradually outwardly until the accumulation of crops is such that the plates 42 reach the full line positions of Fig. 3, whereupon the control means causes shifting of the clutch member 100 to disengage the feed roll sleeve 84 and to engage the clutch jaw 102 with the bevel gear 88. Thus, the feed rolls stop and the actuating means is mobilized, the crank 96 making one revolution to move the ejector 46 from its full line position of Fig. 2 to its dotted line position of that figure, thereby moving the accumulated bale from the spindle portion 36 to the spindle portion 38, the ejector 46 retracting in the last half of its cycle. The manner in which the plates 42 are held in their radially outermost positions by the lugs 126 and ears 128 has already been described.

When the ejector 46 reaches its starting position, the plates 42 are released from the holding means comprising the lugs 126 and ears 128 and these plates thereupon return to their dotted line positions of Fig. 3, the result being that the spring 112 of the control means returns the clutch member 100 to a position in which its jaw 104 engages the feed roll sleeve 84 and disengages the bevel gear 88, thus again mobilizing the feed rolls and simultaneously demobilizing the actuating means 44 until another bale is formed on the spindle portion 36. At that point, the ejector 46 will again move from front to rear and return and the second bale will eject the first bale from the spindle portion 38. The operation is repeated and successive bales are ejected from the chute 48 to be picked up or otherwise collected in any suitable manner.

Features and advantages of the invention in addition to those clearly appearing from the foregoing description will undoubtedly occur to those versed in the art, as will many modifications and alterations in the preferred embodiment of the invention disclosed, all of which may be achieved without departing from the spirit and scope of the invention.

What is claimed is:

1. An agricultural crop baler, comprising: a mobile frame advanceable over a field of crops; a rotary crop-winding spindle journaled on the frame and having first and second opposite end portions; driving means rotating the spindle; crop pick-up means on the frame for collecting field-borne crops; feed means on the frame for receiving crops from the pick-up means and operative to transfer the crops to the spindle adjacent to the first end portion of the spindle and in a direction transverse to the spindle axis for winding of the crops on the rotating spindle to accumulate as a cylindrical bale; reciprocating means movable on the frame in parallelism with the spindle from an idle position adjacent to the first end of the spindle and toward the second end of the spindle to engage that end portion of the accumulated bale proximate to the first end portion of the spindle and to move such bale clear of the feed means; actuating means operative to move the bale-moving means from and then back to its idle position; and control means operative in response to a predetermined accumulation of crops on the spindle in the aforesaid cylindrical bale form for causing operation of the actuating means.

2. The invention defined in claim 1, including: normally engaged but interruptible drive means for the feed means; and means operative upon operation of the actuating means for interrupting said drive means during actuation of the bale-moving means.

3. The invention defined in claim 2, in which: the feed means comprises a rotary feed element journaled on the frame on an axis parallel to the spindle axis.

4. The invention defined in claim 1, in which: the control means includes a plate-like device in overlying relation to the spindle and biased to a radially inward position proximate to the spindle so that crops fed to the spindle enter between the spindle and said device, and said device is carried by the frame for movement radially outwardly from the spindle as the bale accumulates, said device in a predetermined radially outward position causing the aforesaid operation of the actuating means.

5. The invention defined in claim 1, in which: the bale-moving means includes an ejector centrally apertured to accommodate the spindle and having a bale-engaging face radial to the spindle; and the actuating means includes a selectively mobilizible and demobilizible crank transverse to the spindle axis and a pitman connecting the crank to the ejector.

6. The invention defined in claim 5, in which: the feed means includes a rotary element journaled on the frame on an axis parallel to the spindle axis, drive means normally engaged but interruptible to respectively drive and stop said element; and a drive train interconnecting the drive means and the crank and operative to mobilize the crank while said drive means is interrupted and to demobilize the crank while said drive means is engaged.

7. The invention defined in claim 5, in which: the control means includes a plate-like device in overlying relation to the spindle and biased to a radially inward position proximate to the spindle so that crops fed to the spindle enter between the spindle and said device, and said device is carried by the frame for movement radially outwardly from the spindle as the bale accumulates, said device in a predetermined radially outward position causing mobilizing of the crank and in its radially inward position causing demobilizing of the crank; and the ejector includes means thereon engaging and holding the device in its radially outward position during return of the ejector to its idle position, said holding means being disengageable from and operative to release the device for return to its radially inward position when the ejector attains its idle position.

8. The invention defined in claim 1, an ejector comprising part of the bale-moving means, said ejector being centrally apertured to accommodate the spindle and having a bale-engaging face radial to the spindle; and a bearing support journaling the spindle and carrying the ejector for reciprocation axially of the spindle.

9. The invention defined in claim 8: including, as part of the actuating means, a crank transverse to and journaled on the support and a pitman connecting the crank to the ejector.

10. The invention defined in claim 8, including: a pair of guide bars parallel to and flanking the spindle, said guide bars being connected to the ejector and slidably engaging the support.

References Cited in the file of this patent

UNITED STATES PATENTS

| 750,672 | Luebben | Jan. 26, 1904 |
| 2,336,491 | Luebben | Dec. 14, 1943 |

FOREIGN PATENTS

| 483,663 | Germany | Oct. 11, 1929 |